July 15, 1952

J. M. ROPER 2,603,699

APPROACH LIGHT

Filed Feb. 1, 1946

INVENTOR
JOHN M. ROPER
BY
M. C. Hayes
ATTORNEY

Patented July 15, 1952

2,603,699

UNITED STATES PATENT OFFICE 2,603,699

APPROACH LIGHT

John M. Roper, Washington, D. C.

Application February 1, 1946, Serial No. 644,986

5 Claims. (Cl. 177—327)

(Granted under the act of March 3, 1883, as amended April 30, 1928; 370 O. G. 757)

This invention relates to an approach light, and has for an object to provide an approach light especially intended for use in connection with aircraft, the light being mounted either on the aircraft, or along the boundaries of a landing field and the approach edge of an aircraft carrier, or on both the aircraft and the landing area.

A further object of this invention is to provide an approach light which, by means of the color of the light visible therefrom, will indicate to the pilot, either directly or through intermediary of a signal man, whether he is approaching the landing field at the proper gliding angle and speed for a safe landing, or whether he is approaching at too great or too low an angle, so that he may guide himself accordingly, the light being so arranged that when conditions of speed and angle are proper for a safe landing, one color of light is visible, and when conditions are unfavorable for a safe landing, either of two or more other colors of light will be visible so that the pilot may correct his speed and angle accordingly or defer the attempt to land.

Another object of this invention is to provide an approach light having improved constructional details over the details shown in this inventor's prior Patent No. 2,386,268, this invention being used under the same circumstances and in the same manner as set forth in such prior patent.

With the foregoing and other objects in view, the invention consists in the construction, combination and arrangement of parts hereinafter set forth, claimed and illustrated in the drawing, in which:

Figure 5:
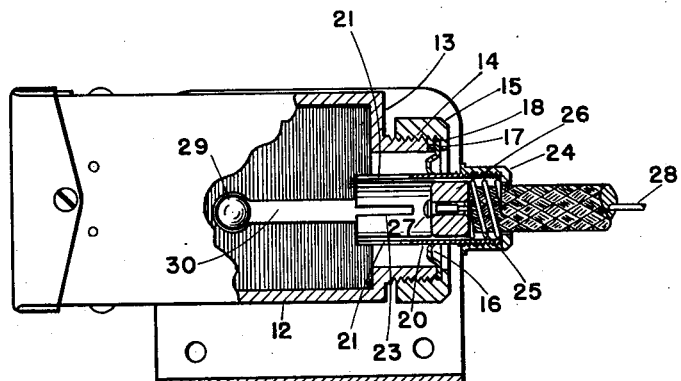
Fig. 5 is a partly sectional view on line 5—5 of Fig. 4.
Figure 3:
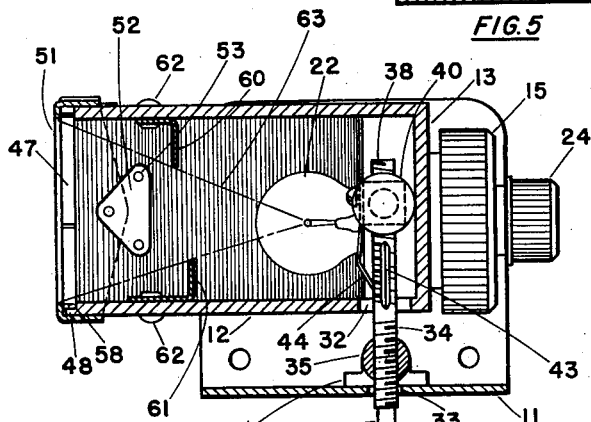
Fig. 3 is a sectional view on line 3—3 of Fig. 2.
Figure 4:
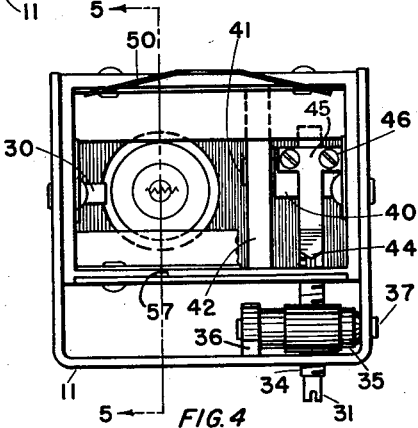
Fig. 4 is a view similar to Fig. 2 with the window removed and certain parts in fragmentary detail.
Figure 1:
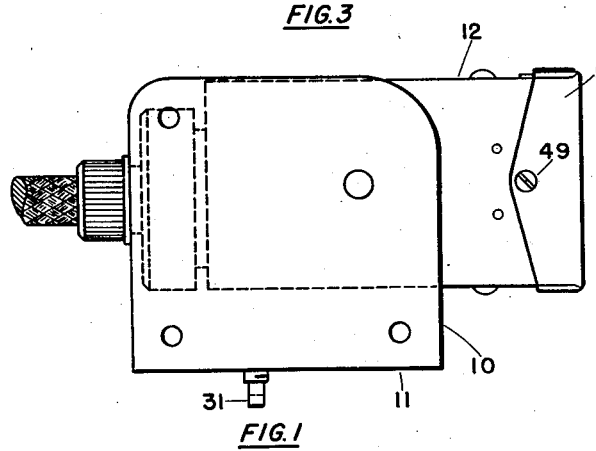
Fig. 1 is a side elevational view of the approach light of this invention including its supporting bracket.
Figure 2:
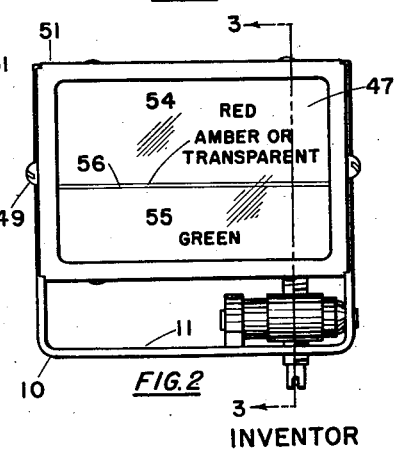
Fig. 2 is a front elevational view of the light of Fig. 1.

There is shown at 10 the approach light of this invention which consists of a supporting bracket 11 and a relatively long box-like, and in this case rectangular, housing 12, made of a suitable plastic such as bakelite or other phenolic condensation product. Inasmuch as it is essential that the inside of the housing shall be non-reflecting, the plastic material may be made entirely of black material. Integrally molded to the end wall 13 of the housing 12 is an externally threaded cylindrical neck 14 cooperating with a cylindrical knurled cap nut 15 serving to support and secure a collar 16. This collar 16 is provided with a key projection 17 extending into a keyway 18 in the neck 14 preventing the collar 16 from rotating. Extending through and fastened to this collar 16 is a lamp socket 20 provided with bayonet slots 21 for receiving the base of a lamp bulb 22, expansion slots 23 being provided intermediate the bayonet slots.

Exteriorly of the approach light, the lamp socket 20 is threaded to receive a knurled cap nut 24 against which is based an expansion coil spring 25 yieldably pressing an insulation cylinder 26 through which extends a contact member 27 to which is secured an insulated wire 28 against the center contact in the base of the lamp 22. The lamp 22 is grounded to complete its circuit through the socket 20 and collar 16 which contacts against a metal ribbon 30 leading to the nearer of two pivoting rivets 29, by which the insulating housing 12 is supported on the metal bracket 11.

In order to positively adjust the angle of the housing 12 to its supporting bracket 11, and at the same time positively secure the housing at the desired adjusted angle, there is provided a reverse threaded screw 31 extending through a slot 32 in the housing 12 and through a suitable aperture 33 in the bracket 11. One thread 34 of the screw 31 extends through a nut 35 pivotally anchored between a stanchion 36 secured to the bottom of the bracket 11 and a pivot 37 extending through a side of the bracket. The other thread 38 extends through another nut 40, which is pivotally anchored in the housing 12 by means of an integrally extending spindle 41 extending through an integrally formed web 42 in the housing 12 on one side. On the other side, the nut 40 is journaled by means of a cylindrical flange, having a diameter at least equal to the maximum diameter of the nut 40, in a cylindrical opening in the sidewall of the housing, the nut being held in place by the fact that the screw 31 keeps it in position as well as the fact that the sidewall of the bracket 11 is closely adjacent the sidewall of the housing. To permit the screw 31 to be easily rotated for adjusting purposes and yet prevent it from rotating accidentally, as under vibration, for instance, a plurality of longitudinal grooves 43, four being shown here, are provided on the surface of the screw 31 extending along the thread 38 and cooperating with a spring tongue 44 having a T-base 45 secured by screws 46 to the nut 40. It will be apparent that the screw 31 may be readily adjusted by means of a screw driver in the kerf on the extending end of the screw 31; yet the pressure of the spring tongue 44 in any one of the grooves 43 will provide sufficient friction and pressure to prevent the screw 31 from turning of itself.

The other end of the housing 12 is provided with a window 47 which is secured against the other end of the housing 12 between a projecting ledge 48 and a leaf spring 50 by a rectangular frame 51 secured by screws 49 threaded into screw plates 52 riveted as at 53 to the insides of the housing.

The window 47, as shown, is tri-colored and is made preferably of a suitable plastic, although if desired, it may be of more than three colors, a transparent portion being considered as a color. As herein shown, the upper portion 54 is preferably red, the bottom portion 55 is preferably green and an intermediate dividing portion 56 is preferably amber or transparent. The amber or transparent portion 56 is fairly narrow and is so located that it is in a direct horizontal line with the filament of the lamp 22, the lamp 22 being of such a nature that the filament therein is accurately and horizontally located. To insure that the window 47 will be correctly placed in the end of the housing and not accidentally reversed, it may be provided at one side point with a key projection 57 fitting into a corresponding notch 58 in the housing ledge 48.

The window 47 has been described as being made of a suitable plastic material, but it will be understood, of course, that the term "plastic material" includes glass as well as any of the various transparent and translucent materials that have recently come on the market.

While the window 47 has been described as having three colors, it will be apparent that four or more colors could be provided with the additional colors providing different information to the signal man; thus the additional colors might be so located that when the light shines through one of the additional colors, the angle of approach is suitable for a plane with one range of landing speeds, while another visible color indicates a safe landing for a plane with a different range of landing speeds. These additional colors may also serve to indicate to a plane of one landing speed that he is approaching at an improper angle, yet not so improper an angle that he cannot still correct it within that landing run, while if on the other hand, still another color is visible, he knows he is so far from the proper landing speed that he cannot possibly hope to correct it and instead, must pull out for a new approach.

To insure that the color of the light visible at one particular angle should be as clear as possible, it is preferable that only direct rays from the filament of the lamp 22 reach the window 47 and that reflected rays be avoided as much as possible. Accordingly, the housing is made of a material that is inherently non-reflecting, such as black or is painted black if necessary. In addition, ray curtains 60 and 61 are mounted within the housing 12. These ray curtains consist of angle plates having one leg riveted to the inside of the housing wall as at 62 and the other leg extending into the housing across the top and bottom thereof to a point determined by the outermost direct rays 63 that can pass from the filament of the lamp 22 through the window 47 without being reflected.

The use in operation of this invention is identical with that shown and described in the above-mentioned prior Patent No. 2,386,268, particularly with reference to Figs. 5, 6 and 7 thereof. Briefly, the approach light of this invention, when mounted on an aircraft and properly adjusted with relation to its landing speed, will reveal an amber or transparent color to a signal man or observer in the landing area when the plane is approaching at the proper angle for a safe landing. If the angle of approach is too great, then a red light will be visible to the signal man, indicating that a continued approach would of course cause a crash; while if the angle is too shallow, a continued approach at that angle will cause the plane to overshoot, whereby the signal man may signal to the plane accordingly. When the approach light is mounted on the landing area, then the pilot may place his plane in the proper groove by approaching it at such an angle and speed that the transparent or amber colored light is visible to him, thus keeping him "in the groove" for a proper landing. If he sees a red light, he knows he is coming in at an angle too great and will crash if he continues, while if he sees a green light, he knows he is coming in at an angle too shallow and will overshoot the landing area, whereby he may act accordingly.

Other modifications and changes in the number and arrangement of the parts may be made by those skilled in the art without departing from the nature of this invention, within the scope of what is hereinafter claimed.

The invention herein described and claimed may be manufactured and used by or for the Government of the United States of America for governmental purposes without the payment of any royalties thereon or therefor.

What is claimed is:

1. An aircraft approach light comprising a bracket having angularly offset portions and adapted to be permanently installed, an approach light housing pivotally mounted within said bracket and means for adjusting the angle of said housing to said bracket and for holding said bracket and housing at the adjusted angle comprising a nut pivotally mounted in said housing, a nut pivotally mounted in said bracket, and a reverse threaded screw extending through both said nuts.

2. An aircraft approach light comprising a bracket adapted to be permanently installed, an approach light housing pivotally mounted on said bracket and means for adjusting the angle of said housing to said bracket and for holding said bracket and housing at the adjusted angle comprising a nut pivotally mounted in said housing, a nut pivotally mounted in said bracket, a reverse threaded screw extending through both said nuts, and a leaf spring secured to one of said nuts and having a free end yieldably held against the screw surface, permitting said screw to be rotated for intentional adjustment, but preventing it from rotating of itself.

3. An aircraft approach light comprising a bracket adapted to be permanently installed, an approach light housing pivotally mounted on said bracket and means for adjusting the angle of said housing to said bracket and for holding said bracket and housing at the adjusted angle comprising a nut pivotally mounted in said housing, a nut pivotally mounted in said bracket, a reverse threaded screw extending through both said nuts, said reverse threaded screw having a plurality of longitudinally extending circumferentially spaced grooves cut through some of the threads thereof, and a leaf spring secured to one of said nuts and having a free end yieldably held against the screw surface and adapted to enter any one of said grooves, thereby permitting said screw to be rotated for intentional adjustment, but preventing it from rotating of itself.

4. An aircraft approach light comprising a bracket adapted to be permanently installed, an approach light housing pivotally mounted on said bracket and means for adjusting the angle of said housing to said bracket and for holding said bracket and housing at the adjusted angle comprising a nut pivotally mounted in said housing, a nut pivotally mounted in said bracket, a reverse threaded screw extending through both of said nuts, resilient means mounted adjacent said screw and having a free end yieldably held against the screw surface, permitting said screw to be rotated for intentional adjustment, but preventing it from rotating of itself.

5. An aircraft approach light comprising a bracket adapted to be permanently installed, an approach light housing pivotally mounted on said bracket and means for adjusting the angle of said housing to said bracket and for holding said bracket and housing at the adjusted angle, an upright support positioned within and at the rear of said housing forming with the housing walls two juxtapositioned compartments, said means in part being pivotally supported by said support within one of said compartments and in part being pivotally supported by said bracket, a lamp mounted in and extending outwardly from the other of said compartments, a transparent multi-colored window mounted at the front end of said housing, and means positioned within said one compartment and operatively associated with said adjusting means permitting intentional but not accidental adjustment of said housing.

JOHN M. ROPER.

REFERENCES CITED

The following references are of record in the file of this patent:

UNITED STATES PATENTS

| Number | Name | Date |
| --- | --- | --- |
| 809,044 | Clark | Jan. 2, 1906 |
| 998,795 | Palmer | July 25, 1911 |
| 1,794,617 | Howe | Mar. 3, 1931 |
| 1,832,315 | McNulty | Nov. 17, 1931 |
| 1,842,224 | Wells | Jan. 19, 1932 |
| 2,278,916 | Critoph et al. | Apr. 7, 1942 |
| 2,296,674 | Ingels | Sept. 22, 1942 |
| 2,386,268 | Roper | Oct. 9, 1945 |